United States Patent
Barsness et al.

(10) Patent No.: US 7,865,509 B2
(45) Date of Patent: Jan. 4, 2011

(54) CREATING PROFILING INDICES

(75) Inventors: Eric Lawrence Barsness, Pine Island, MN (US); Brian Robert Muras, Rochester, MN (US); John Matthew Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 267 days.

(21) Appl. No.: 12/246,014

(22) Filed: Oct. 6, 2008

(65) Prior Publication Data

US 2009/0037372 A1 Feb. 5, 2009

Related U.S. Application Data

(63) Continuation of application No. 10/753,523, filed on Jan. 8, 2004, now Pat. No. 7,461,089.

(51) Int. Cl.
*G06F 17/30* (2006.01)

(52) U.S. Cl. .................. 707/741; 707/715; 707/753; 707/802

(58) Field of Classification Search .............. 707/741
See application file for complete search history.

(56) References Cited

U.S. PATENT DOCUMENTS

| | | | |
|---|---|---|---|
| 5,745,745 A | 4/1998 | Tada et al. | |
| 5,845,276 A | 12/1998 | Emerson et al. | |
| 6,021,409 A | 2/2000 | Burrows | |
| 6,105,019 A | 8/2000 | Burrows | |
| 6,272,456 B1 | 8/2001 | de Campos | |
| 6,278,992 B1 | 8/2001 | Curtis et al. | |
| 6,556,990 B1 | 4/2003 | Lane | |
| 6,711,563 B1 | 3/2004 | Koskas | |
| 6,738,779 B1 | 5/2004 | Shapira | |
| 6,785,677 B1 | 8/2004 | Fritchman | |
| 7,401,069 B2 | 7/2008 | Day et al. | |
| 7,461,089 B2 | 12/2008 | Barsness et al. | |
| 7,546,316 B2 | 6/2009 | Dunning et al. | |

(Continued)

OTHER PUBLICATIONS

U.S. Patent and Trademark Office, Office Action issued in related U.S. Appl. No. 10/753,523, dated Jul. 11, 2006.

(Continued)

*Primary Examiner*—Apu M Mofiz
*Assistant Examiner*—Monica M Pyo
(74) *Attorney, Agent, or Firm*—Wood, Herron & Evans, LLP

(57) ABSTRACT

A database engine and optimizer framework support creation of a series of profiling indices over a column having character string data, such as a traditional "varchar" data type. The profiling indices result in a reduction of the number of records that are searched when searching for a sub-string match within that column. In some embodiments, the series of indices are created over a column that is typically searched using the LIKE predicate or some similar technique; these indices indicate for each record whether certain sub-strings may exist in that record's value in the column. Thus, the indices are used to find the rows that may match one or more portions of the particular term being queried or, in other words, eliminate those records that do not have at least a portion of the term to be matched. The number of records actually retrieved and searched for the query sub-string is thereby reduced.

4 Claims, 3 Drawing Sheets

U.S. PATENT DOCUMENTS

2004/0236736 A1 11/2004 Whitman et al.
2005/0071741 A1 3/2005 Acharya et al.
2005/0154757 A1* 7/2005 Barsness et al. .......... 707/104.1

OTHER PUBLICATIONS

U.S. Patent and Trademark Office, Office Action issued in related U.S. Appl. No. 10/753,523, dated Dec. 20, 2006.
U.S. Patent and Trademark Office, Final Office Action issued in related U.S. Appl. No. 10/753,523, dated May 16, 2007.
U.S. Patent and Trademark Office, Office Action issued in related U.S. Appl. No. 10/753,523, dated Oct. 29, 2007.
U.S. Patent and Trademark Office, Notice of Allowance issued in related U.S. Appl. No. 10/753,523, dated Jul. 14, 2008.
U.S. Patent and Trademark Office, Office Action issued in related U.S. Appl. No. 11/930,905, dated Jan. 25, 2010.

* cited by examiner

400

| Sub-string | Index 1 | Index 2 | ... | Index 256 | Field 1 | Field 2 | ... | Field 13 |
|---|---|---|---|---|---|---|---|---|
|  | a | b |  | z | Date | varchar |  | Integer |
| Record |  |  |  |  |  |  |  |  |
| 1 | 0 | 1 |  | 0 | value 1 | value 1 |  | value 1 |
| 2 | 1 | 1 |  | 0 | value 2 | value 2 |  | value 2 |
| ... |  |  |  |  |  |  |  |  |
| 10,000 | 1 | 1 |  | 1 | value 3 | value 3 |  | value 3 |

| Sub-string | Index 1 | Index 2 | ... | Index 100 | Field 1 | Field 2 | ... | Field 13 |
|---|---|---|---|---|---|---|---|---|
|  | 00 | 01 |  | 99 | Date | varchar |  | Integer |
| Record |  |  |  |  |  |  |  |  |
| 1 | 0 | 1 |  | 0 | value 1 | value 1 |  | value 1 |
| 2 | 1 | 1 |  | 0 | value 2 | value 2 |  | value 2 |
| ... |  |  |  |  |  |  |  |  |
| 10,000 | 1 | 1 |  | 1 | value 3 | value 3 |  | value 3 |

FIG. 4B

CREATING PROFILING INDICES

CROSS-REFERENCE TO RELATED APPLICATIONS

This application is a continuation of U.S. patent application Ser. No. 10/753,523, filed on Jan. 8, 2004 by Eric Lawrence Barsness et al., and is related to U.S. patent application Ser. No. 11/930,905 filed on Oct. 31, 2007, by Eric Lawrence Barsness et al., which is a divisional of the aforementioned U.S. patent application Ser. No. 10/753,523, the entire disclosures of which are incorporated by reference herein.

FIELD OF THE INVENTION

The invention relates to database management systems, and in particular, to generating one or more indices over a table column.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that improves query performance is the use of an index over a field or fields of a table. A table is a logical structure maintained by the database management system. Tables are made up of columns and rows. There is no inherent order of the rows within a table. At the intersection of every column and row is a specific data item called a value. A column, or field, is a set of values of the same data type. A row is a sequence of values such that the nth value is a value of the nth column of the table. An index is a set of pointers to a table that has an entry for each record of the table. This entry is dependent on the value of that record in one or more columns of the table.

One use of an index is to create an order for the records of the table. For example if one of the columns of the table is a person's last name then building an index over that column would create an index that is ordered according to the alphabetical order of the last names in the table. Another type of index is used to indicate the value of a field of a particular record. For example, in a database that pertained to automobile inventory, there may be a field that indicates the color of the automobile and the allowed values for this field are only red, green, blue, black and white. An index could be created over this column that assigns a unique value to each of these five possible colors (i.e., a binary number consisting of 3 bits). With such an index created, a query that includes selection criteria that involves the color of the automobile can benefit from this index, such as a query which finds all the green cars. Without the index, each record of the table would need to be retrieved and the "color" field would be scanned to see if it matches "green". This process is time consuming, especially with a large table. With the index created, however, the database engine can scan the index to find the rows containing the "green" value and only retrieve the corresponding records from the table. Scanning the index is much faster than touching every record in a table and the amount of records retrieved is significantly reduced as well.

An index as just described works well with a column that has a small number of possible values. However, there are other data types such as a "character-field" over which indexing has not appeared to be useful. These character-field, or variable character, data types allow, in many instances, up to 32K characters of a character string to be stored. One common activity which database users frequently perform on such character strings is to search the text in the string for a particular matching sub-string using the LIKE predicate. An example SQL statement might resemble:

SELECT LastName FROM Customers
WHERE Lastname LIKE 'Mar %'

This query would return all the last names of all the records in the table that start with the letters "Mar". Performing searching on a large field of characters using the LIKE predicate is very time consuming as it requires opening every record in the table and then performing a search of a large value of that record (i.e., the character-string value). Thus, there remains an unmet need for using an index to help with searching of a character-string value, such as by the LIKE predicate.

SUMMARY OF THE INVENTION

Embodiments of the present invention include a database engine and optimizer framework that support creation of a series of profiling indices over a column having character string data, such as a traditional "varchar" or "char" data type.

The profiling indices result in a reduction of the number of records that are searched when searching for a sub-string match within that column. In some embodiments, the series of indices are created over a column that is typically searched using the LIKE predicate or some similar technique; these indices indicate for each record whether certain sub-strings may exist in that record's value in the column. Thus, the indices are used to find the rows that may match one or more portions of the particular term being queried or, in other words, eliminate those records that do not have at least a portion of the term to be matched. The number of records actually retrieved and searched for the query sub-string is thereby reduced. In some embodiments, the sub-strings associated with the indices are created based on a historical analysis of queries received from database users.

One aspect of the present invention relates to an apparatus and program product for indexing a database table, wherein the table includes a column of values. In accordance with this aspect, a plurality of substrings are identified, each substring having one or more characters. For each substring, a corresponding index is created over the column, wherein each corresponding index includes a respective entry for each value in the column, the respective entry for a particular value indicating whether the corresponding substring occurs in that particular value. In addition, the respective entry for the particular value is indicative of a number of occurrences of the corresponding substring in the particular value.

BRIEF DESCRIPTION OF THE DRAWINGS

FIGS. 4A and 4B illustrate exemplary tables and indices in accordance with an embodiment of the present invention.

DETAILED DESCRIPTION

As mentioned above, the embodiments discussed hereinafter utilize a database engine and optimizer framework that support creation of a series of profiling indices over a column having character string data, such as a traditional "varchar" data type. The profiling indices result in a reduction of the number of records that are searched when searching for a sub-string match within that column. The series of indices are created over a column that is conventionally searched using the LIKE predicate; these indices indicate for each record whether certain sub-strings may exist in a that record's value in the column. Thus, the indices are used to find the rows that may match one or more portions of the particular term being queried or, in other words, eliminate those records that do not have at least a portion of the term to be matched. The amount of records retrieved and searched for the query term is thereby reduced. A specific implementation of such a database engine and optimizer framework capable of supporting this functionality in a manner consistent with the invention will be discussed in greater detail below. However, prior to a discussion of such a specific implementation, a brief discussion will be provided regarding an exemplary hardware and software environment within which such an optimizer framework may reside.

Figure 1:
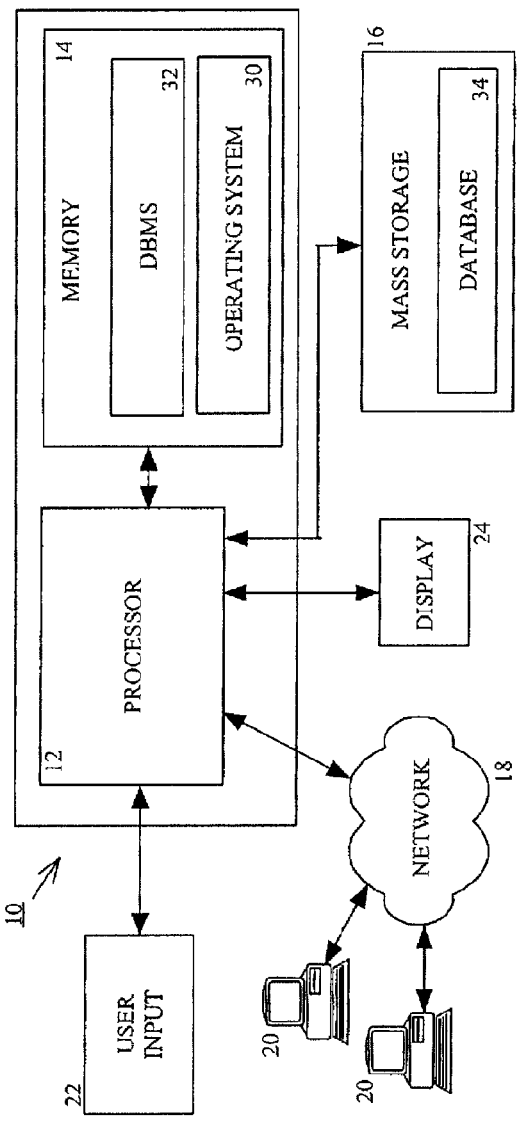
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system that generates profiling indices consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
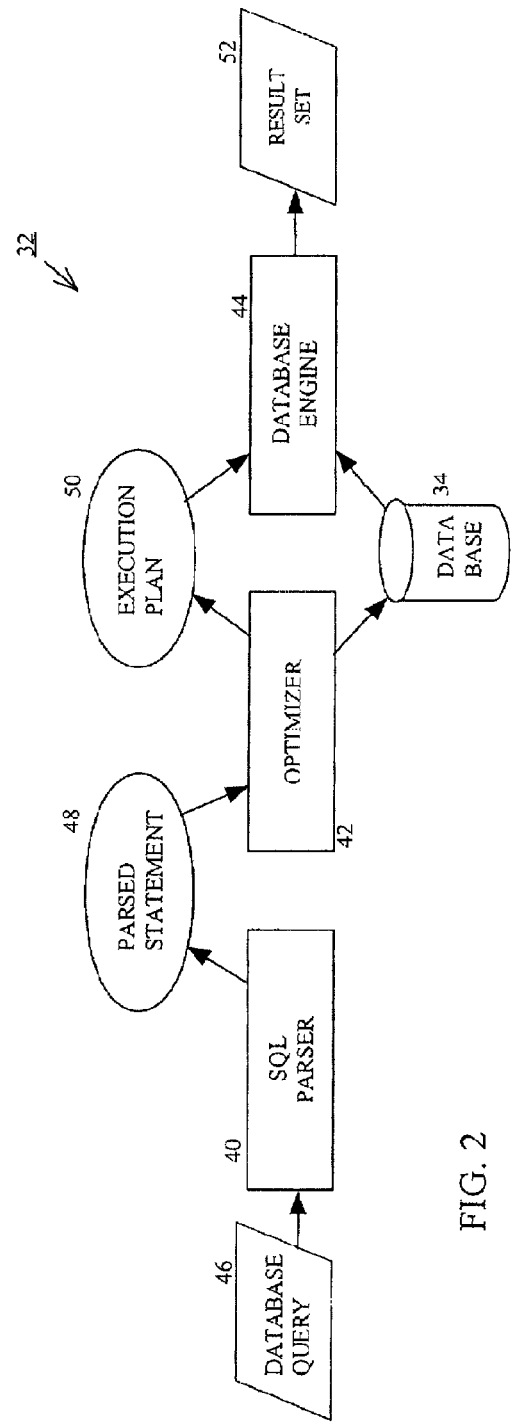
FIG. 2 is a block diagram illustrating the principal components and flow of information there between in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
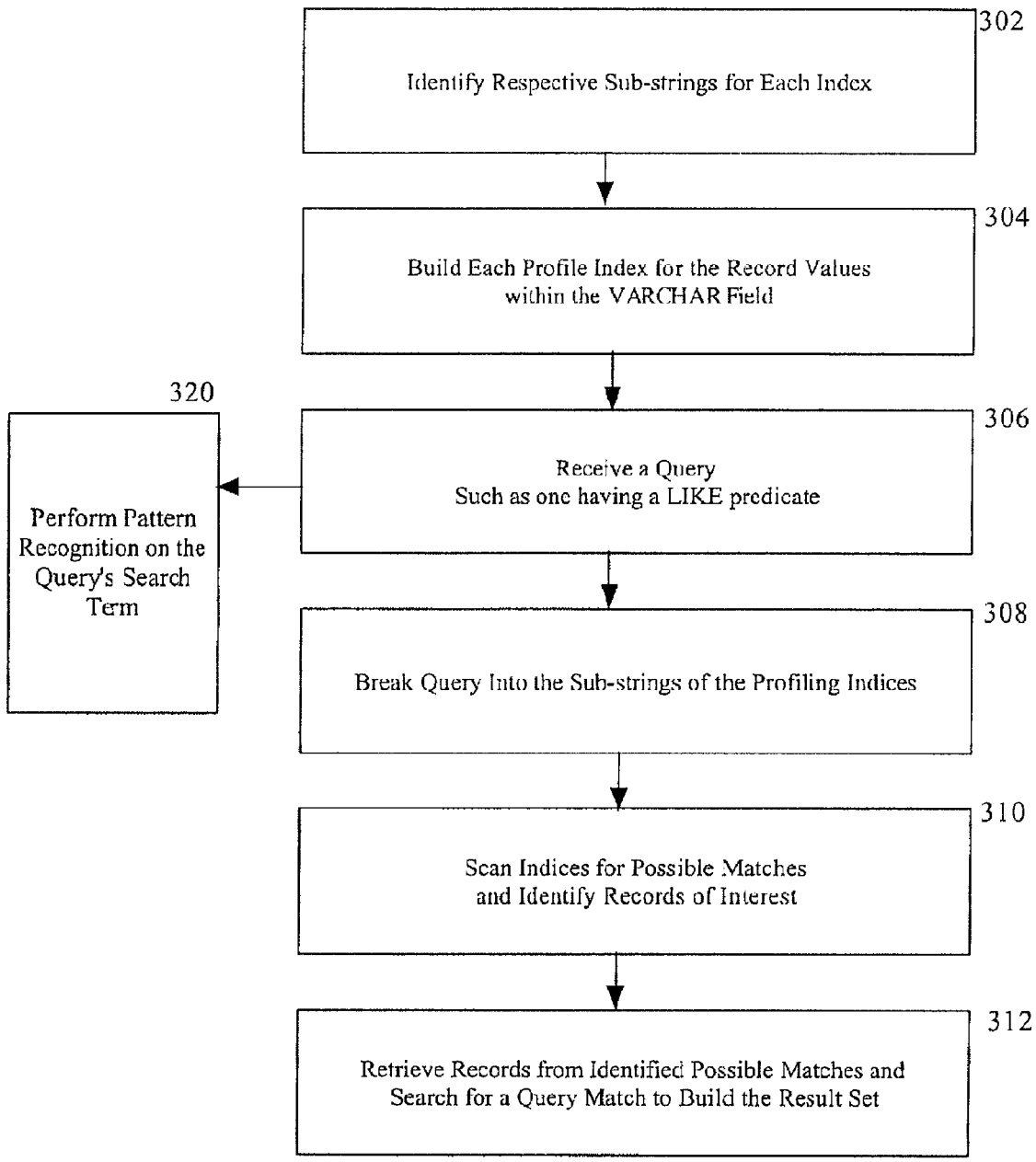
FIG. 3 illustrates a flowchart of an exemplary method for creating profiling indices over a column of a table in accordance with the principles of the present invention.

FIG. 3 illustrates a flowchart of an exemplary method for building and using profiling indices over a character-field column of a table to reduce the amount of records that are retrieved and searched when executing a query. The method is advantageously implemented when executing a query that uses the LIKE predicate to search for a sub-string in a large text string. This method may be implemented as part of the optimizer of a database system that develops different access plans. In some instances, implementing a set of profiling indices may improve query performance and in other instances it may not. The optimizer, therefore, instead of always implementing profiling indices may optionally determine when to use profiling indices in generating a query plan.

To begin with, in step 302, the respective sub-strings for which each profiling index will be built are identified. The identification of sub-strings may be performed manually to comprehensively cover a set of possible sub-strings or may be performed automatically by tracking queries and discovering which sub-strings are frequently searched.

The tables 400, 450 of FIGS. 4A and 4B illustrate exemplary tables and profiling indices. For example, the table 400 includes a number of columns and records. Of particular interest is the column 402 that is labeled "Field2" because it has a "varchar" data type that typically means a long text string will be stored for each value in this column 402. Similarly, the table 450 includes a column of interest as well, such as column 452.

An exemplary set of sub-strings (e.g., 404, 406 and 408) for which to build a profiling index may be each letter of the alphabet or each alphanumeric character that is included in the 8-bit ASCII set. Thus, table 400 depicts 256 different sub-strings, each consisting of a single character and each having its own profiling index. Another exemplary set of sub-strings (e.g., 454, 456, 458) is shown in conjunction with the table 450. If, for example, column 452 pertained to banking records and was frequently searched for account numbers, then profiling indices for numbers might prove particularly useful. In the exemplary table 452, there are 100 profiling indices. Each index corresponds to a sub-string consisting of one pair of characters that represent the numbers "00" through "99".

The method of FIG. 3 continues in step 304 by building each profiling index over a column of the table. Returning to the tables of FIGS. 4A and 4B, it can be seen that each index includes a value for each record in the table. That value for each record indicates whether the corresponding sub-string for that index is located within that record's value in the appropriate column. For instance, in the table 400, each profiling index 405, 407, 409 is built over the Field2 (i.e., column 402) and has a binary value for each record of the table. The binary value for a record indicates whether the corresponding sub-string (i.e., that character) is in that record's value in the column 402. Similarly, the values in the indices of the table 450 of FIG. 4B indicate whether or not a particular two-digit combination exists within a value in column 452. Thus, to build an index for one sub-string in step 304 (using for example Table 400), the value in column 402 is scanned for each record to determine if that particular sub-string is present and the index value is set for each record. This process is then repeated to build an index for each substring. Alternatively, an index building process could run for each separate index and when a record is open. In this alternative, the index values for all the indices are set for that record before moving on to the next record. In addition to index values being merely binary, the values may alternatively represent the number of times the corresponding index sub-string occurs within the value in the table.

In the process of executing SQL queries, a query is eventually received, in step 306, that involves searching for a sub-string in a field whose values are large text strings. One particular query of this type is an SQL query that includes a LIKE predicate referencing a column having a "varchar" data-type. The LIKE predicate will include a search term with which to scan the values in the column, or field of the table. In step 308, the search term is parsed and broken into search sub-strings according to the sub-strings associated with the profiling indices.

For example, because the index sub-strings 404, 406, 408 of the table 400 are single characters, then the search term is broken into single characters as well. If, for example, the search term in the LIKE predicate is "% run %", then the search sub-strings become "r", "u", "n". In the case of table 450, a search term may be "340597". Exemplary search sub-strings may be "34", "05", "97" or even "34", "40", "05", "59", "97". Thus, the way the search term is broken into search sub-strings depends on the index sub-strings.

Once the search sub-strings are identified for the query, then, in step 310, the profiling indices are scanned to determine which records are possible matches. In this step, the profiling index that matches a search sub-string is scanned to determine which records have that search sub-string in their corresponding values in column 402. (or 452). This scanning step is repeated for each of the search sub-strings. When the values of the profiling indices are binary values, such as in the exemplary tables, scanning of the various indices may advantageously be performed by logically combining the set of profiling indices that correspond to the search sub-strings. Returning to the "% run %" example, the profiling indices for "r", "u", "n" can be AND'd together to generate a bitmap. The bit map will have a value for each record of the table with the value being "1" for any record that has a "r", "u", and "n" in its value in column 402. The indices can be combined or aggregated in other ways, as well, to identify those records in the table that may match the query search term.

Thus, when executing the query, the database engine may limit the number of records retrieved and searched by retrieving, in step 312, only those records identified in step 310. The other records do not need to be retrieved. For those records that are retrieved, the values of these records in the appropriate column are then searched to determine if the search term (not just its separate sub-strings) are actually in the record's value. From this determination, the result set is generated and provided to the database user.

The queries that are received in step 306 offer a lot of information about how a particular column of a table is typically searched. For that reason, in step 320, the search terms that are a part of the received queries are analyzed using conventional pattern recognition techniques. For example, if these techniques determine that a particular character pattern is commonly present in many queries, then this character pattern is a good candidate for which to build a profiling index. As another example, a count can be maintained for specific terms used in LIKE clauses, if such a term is received more than a predetermined number of times, then a profiling index for that term is built.

In addition to the above-described profiling indices, another particular method for implementing the profiling indices is to use a matrix for each record that is built over a column of values. One specific exemplary matrix tracks pairs of byte-sized characters for each row (i.e., 256 possible characters). Thus, the matrix is 256×256 and each value of the matrix tracks the existence, or possibly the count of, adjacent letters in a record's value. Thus, for the search term "pizza", the search substrings are (p, i), (i, z), (z, z), (z,a) and the matrix will have a particular value at each of these elements. However, instead of having a separate matrix for each record in the table, the matrix may include a third dimension that stores, for each character combination, the record numbers of those records having that character combination in their respective values. In operation, a bitmap over all the records is built based on the matrix values in order to determine which records will be retrieved and scanned for a particular query. For instance, a first bitmap is generated with all the records associated with the matrix element (p, i) being turned on; a separate bitmap is created for each of the other character combinations identified above. These bitmaps are then AND'd together to determine if any records should be retrieved and scanned. Additionally, various, well-known, techniques exist for manipulating and working with sparse matrices. As the exemplary 256×256 matrix just described will likely be a sparse matrix (i.e., one in which most of the values are zero), these techniques may advantageously be used in carrying-out embodiments of the present invention.

Various modifications may be made to the illustrated embodiments without departing from the spirit and scope of the invention. For example the terms column, row, field, table and value are usually used in connection with relational databases. However, these terms are not meant to limit the present invention to relational databases as these terms may be used in general to describe like entities in other types of databases such as, for example, object-oriented databases and flat file structures. Therefore, the invention lies in the claims hereinafter appended.

What is claimed is:

1. An apparatus, comprising:
at least one processor;
a memory coupled with the at least one processor; and
program code configured to index a database table of the type including a column of values by identifying a plurality of substrings, each substring comprising one or more characters; and for each substring creating a corresponding index over the column such that a plurality of substring-specific indices, each corresponding to a particular substring from among the plurality of substrings, are created for the same column, wherein each corresponding index includes a respective entry for each value in the column, the respective entry for a particular value being indicative of whether the corresponding substring occurs in the particular value, and wherein the respective entry for the particular value is indicative of a number of occurrences of the corresponding substring in the particular value.

2. The apparatus of claim 1, wherein each search substring has a length of two characters, and wherein there are 100 search substrings representing, in character format, the numeric range from 00 to 99.

3. A program product for indexing a database table of the type including a column of values, the program product comprising:
program code configured upon execution thereof to:
identify a plurality of substrings, each substring comprising one or more characters, and
for each substring, create a corresponding index over the column such that a plurality of substring-specific indices, each corresponding to a particular substring from among the plurality of substrings, are created for the same column, wherein each corresponding index includes a respective entry for each value in the column, the respective entry for a particular value being indicative of whether the corresponding substring occurs in the particular value, and wherein the respective entry for the particular value is indicative of a number of occurrences of the corresponding substring in the particular value; and
a computer readable storage medium storing the program code.

4. The program product of claim 3, wherein each search substring has a length of two characters, and wherein there are 100 search substrings representing, in character format, the numeric range from 00 to 99.

* * * * *